United States Patent [19]

Hilal et al.

[11] Patent Number: 5,138,207
[45] Date of Patent: Aug. 11, 1992

[54] FLUX TRAPPED SUPERCONDUCTOR SYCHRONOUS MOTOR WITH CREEP COMPENSATION

[75] Inventors: Mohamed A. Hilal, Madison, Wis.; Jerry D. Lloyd; Alan D. Crapo, both of Florissant, Mo.

[73] Assignee: Emerson Electric Co., St. Louis, Mo.

[21] Appl. No.: 680,533

[22] Filed: Apr. 4, 1991

[51] Int. Cl.⁵ .................................. H02K 37/00
[52] U.S. Cl. .................................. 310/46; 310/261; 310/268
[58] Field of Search ............... 310/46, 10, 52, 40 R, 310/198, 208, 261, 268, 114

[56] References Cited

U.S. PATENT DOCUMENTS

| | | | |
|---|---|---|---|
| 3,564,307 | 2/1971 | Kawabe et al. | 310/10 |
| 3,673,444 | 6/1972 | Kawabe et al. | 310/10 |
| 4,691,133 | 9/1987 | Mongeau | 310/114 |
| 4,829,205 | 5/1989 | Lindgren | 310/114 |
| 4,843,270 | 6/1989 | Dijken | 310/208 |

Primary Examiner—Steven L. Stephan
Assistant Examiner—Matt Nguyen
Attorney, Agent, or Firm—Polster, Lieder, Woodruff & Lucchesi

[57] ABSTRACT

A superconductor motor (10) comprises a stator assembly (14) which includes a plurality of solenoids (40-44). A rotor assembly (12) includes a disk (20) of superconductive material in which are entrapped magnetic lines of flux which cause the rotor to function as a magnet. The lines of flux tend to creep throughout the disk over time thereby reducing the magnetic properties of the rotor assembly and decreasing motor performance. A plurality of coils (48a-48l) are carried by the disk. The stator solenoids are energized to produce rotation of the rotor, and the coils are energized in a predetermined manner to compensate for the flux creep in the disk and to restore the rotor assembly's magnetic properties thus to prevent deterioration in motor performance.

14 Claims, 2 Drawing Sheets

FLUX TRAPPED SUPERCONDUCTOR SYCHRONOUS MOTOR WITH CREEP COMPENSATION

BACKGROUND OF THE INVENTION

This invention relates to synchronous motors fabricated using superconducting materials and, more particularly, to such a motor in which lines of flux are trapped within the rotor portion of the motor. Sections of the motor are intermittently recharged to periodically regenerate the lines of flux and maintain motor performance.

Trapping flux in a superconductor coil or in a bulk material can produce a relatively high magnetic field As the flux trapping capability of high $T_c$ superconducting (HTSC) materials improves, the need for fabricating high current conductors for motor applications will diminish, resulting in increased motor applications. One advantage with these new type motors is their substantially lower weight and smaller size for a given power rating as compared to conventional motors.

Theoretically, magnets made of HTSC materials will have five-to-ten times higher energy than magnets currently in use, for example, those made of rare earth. HTSC coils, or the bulk material used in the new motors, will need to be "charged" or magnetized just as conventional permanent magnets must be. To charge, a rotor comprised of the HTSC material is cooled from a temperature which is above a critical temperature level (4 degrees Kelvin (K), for example), to a temperature which is below this level. A magnetic field is applied to the rotor while it is being cooled, and this field is removed once the rotor temperature falls below critical level. The rotor, in order to maintain the field, induces circulating currents in the superconting material, and these trap flux in the rotor.

Motors which can be produced in accordance with this method are described in co-pending application 679,747, which is assigned to the same assignee as the present application, and is incorporated herein by reference. As described therein, a motor has a rotor of superconductive material and a stator whose windings can either be of a conventional electrically conductive material, or also of a superconductive material To achieve rotor magnetization, the rotor and stator are placed in either the same, or separate, cryostats, depending upon the type of motor (radial gap or axial gap) involved. Regardless, after rotor cooling and stator winding deenergization, the rotor then acts much like a permanent magnet, albeit one having a much higher level of magnetization than conventional or rare earth magnets. Further, the rotor can be magnetized to one level for one application, and to a different level for another application. The motor will remain operational so long as the rotor temperature is kept below the critical level.

A major problem with the above described motors is flux creep, or the dissipation of the trapped lines of flux over time. There are two problems which must be resolved in order to make use of superconductive motors of the type described above practical. First, it is important to be able to restore the lines of flux on some type of periodic basis so the motor will remain a functioning motor. Otherwise, the operating time of the motor (the time it takes for the flux to dissipate to the point where the motor will no longer operate under load conditions) will be so short that use of the motor will be impractical. Second, the method by which flux restoration is achieved must be as non-intrusive as possible. That is, the mechanism by which restoration is achieved should not so interfere with the normal operation of the motor that it cannot function under load conditions.

SUMMARY OF THE INVENTION

Among the several objects of the present invention may be noted the provision of a motor comprised of superconductive coils and superconducting material; the provision of such a motor which is a brushless synchronous motor; the provision of such a motor having rings formed of a superconductive material in which lines of flux can be trapped so the material acts as a permanent magnet; the provision of such a motor in which the rotor material is magnetizable to different levels of magnetization depending upon a particular application for the motor; the provision of such a motor in which lines of flux are periodically restored to compensate for flux creep; the provision of such a motor in which creep compensation is readily accomplished and does not adversely effect operation of the motor while being performed; and, the provision of such a motor in which creep compensation is done on a segmental basis with compensation being sequentially performed on one segment of the motor at a time.

In accordance with the invention, generally stated, a superconductor motor comprises a stator assembly which includes a plurality of solenoids. A rotor assembly includes a disk of superconductive material in which are entrapped magnetic lines of flux which cause the rotor to function as a magnet. The lines of flux tend to creep throughout the disk over time thereby reducing the magnetic properties of the rotor assembly and decreasing motor performance. A plurality of coils are carried by the disk. The stator solenoids are energized to produce rotation of the rotor, and the coils are energized in a predetermined manner to compensate for the flux creep in the disk and to restore the rotor assembly's magnetic properties thus to prevent deterioration in motor performance. Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENTS

Figure 1:
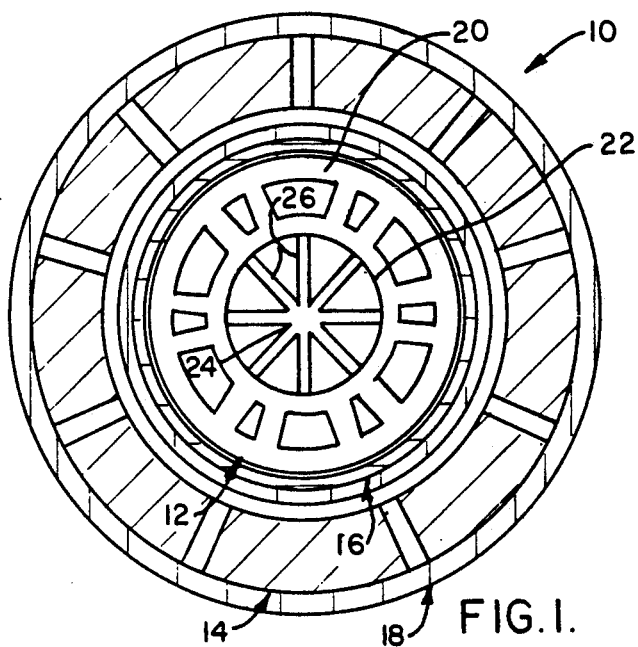
FIG. 1 is an end view of a rotor and stator assembly for a superconductor motor of the present invention.

Referring to the drawings, a superconductor motor of present invention is indicated generally 10. The motor is, for example, a brushless synchronous motor and is comprised of a rotor assembly indicated generally 12 and a stator assembly indicated generally 14. As described in co-pending patent application Ser. No. 679,747, the rotor assembly may be installed in a first cryostat 16, and the stator assembly in a second and separate cryostat 18. The cryostats, for example, filled with liquid nitrogen. The temperature of the rotor assembly is lowered below a critical temperature $T_c$ while a current is flowing through windings (not shown) in the stator assembly. The stator windings are then de-energized. To maintain the magnetic field produced when the stator windings were energized, flux is trapped within the rotor assembly. Alternately, the rotor is magnetized as described hereinbelow. In either event, the motor then acts as a permanent magnet motor for so long as the rotor temperature is maintained below Tc. The level of magnetism attainable greatly exceeds that achieved in conventional motors and rare earth brushless synchronous motors. Unfortunately, over time, the lines of flux trapped in the rotor tend to migrate (creep) throughout the assembly. This reduces the magnetic effect produced in the rotor and decreases motor performance. As a practical matter, the effective operational time of a motor 10 in this situation is on the order of an hour to several days depending upon how much flux can be tolerated. If the motor sits for a prolonged period of time, so the flux decay rate is low, the end flux level, after a few years, can be as much as 30% lower than the original trapped flux.

Figure 2A:
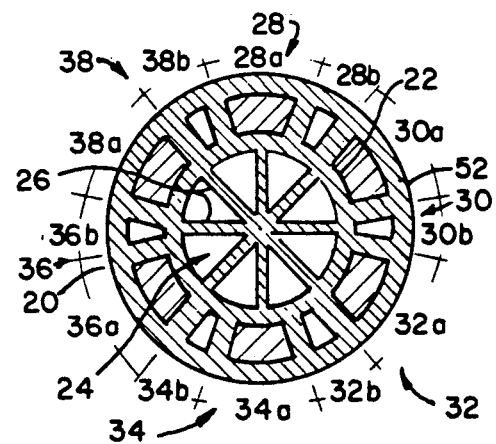
FIGS. 2a and 2b are respective elevational and plan views of a disc comprising a portion of the rotor assembly.
Figure 3:
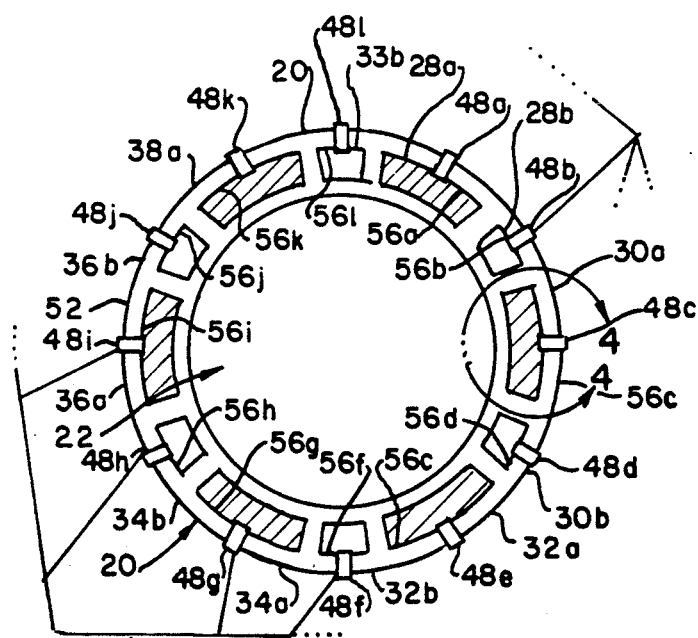
FIG. 3 is an elevational view of a second embodiment of the disk.

The motor 10 of the present invention is designed so that the flux creep can be compensated for in such a way that the enhanced permanent magnet properties of the rotor are periodically refreshed, and refreshed in such a way that normal operation of the motor is not disturbed. Referring to FIGS. 1, 2a, and 3, rotor assembly 12 includes a disk 20 of a HTSC superconductor material. The disk is annular in shape with a central opening 22. This disk is mounted on a shaft 24 which fits within the opening and which has a plurality of radial support arms 26. A plurality of cells 28-38 are formed in the disk, extend circumferentially theraround, and extend axially of the disk. While six cells are shown in the drawings, it will be understood that there can be more or fewer cells. Further, each cell has two axially extending sub-cells 28a, 28b, 30a, 30b, etc. Each sub-cell is formed by a circumferential, axially extending opening. Within each cell, one of the sub-cells 28a, 30a, etc., subtends a larger arcuate segment than the other sub-cell. As seen in FIG. 3, the larger sub-cells may be filled with a material (iron, for example) which is appropriate for the specific motor application. The smaller sub-cells are hollow. The appropriate material completely fills the space within the larger sub-cells. When the magnetic flux is generated in accordance with the teachings of co-pending application 679,747, the lines of flux are generated by currents in the superconductive sub-cell walls. After the flux is generated within the rotor assembly, the lines of flux creep outwardly through the superconductor disk material. One purpose of the hollow, smaller sub-cells 28b, 30b, etc., is to retard the rate of this flux creep so the motor retains its operational characteristics for a longer period of time.

Figure 2B:
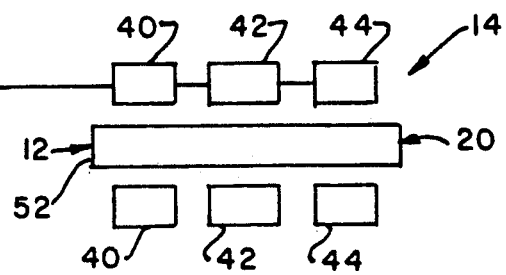
Figure 2B:
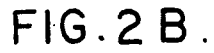

Stator assembly 14 for the motor is shown in FIG. 2 as comprising a plurality of stator windings 40-44 which envelop or surround the rotor assembly. A current controller 46 controls application of current to the windings so they are sequentially energized and de-energized.

Figure 4:
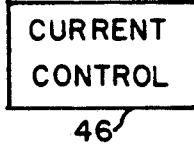
FIG. 4 ia a perspective sectional view of a portion of the disk taken along line 4—4 in FIG. 3.

A plurality of coils 48a-48l are carried by disk 20. Each coil is positioned in one of the sub-cells formed in the disk. As seen in FIG. 4, each coil comprises few coil turns, three turns, for example, being shown in FIG. 4. Each coil turn extends axially of disk 20 with an outer reach 50 of the turns extending along an outer surface 52 of the disk adjacent a sub-cell. An inner reach 54 of each turn extends parallel to the outer reach along an inner wall 56a-56l of the respective sub-cells. If a high resistance wire is used to form the coils, the coils will act to heat the adjacent portion of the disk. Energization of coils 48a-48l is via a control unit 58.

In operation, the motor is cooled to the appropriate temperature. Current control 46 then energizes the respective solenoids 40-44. Coil energization control 58 then pulses the coils extending through the large sub-cells 28a-38a (i.e., coils 48a, 48c, etc.). This causes the sections of the superconductor disk which have been heated by current flow through the coils to go normal. The lines of flux generated by solenoids 40-44 now penetrate into the interior of these large sub-cells. As the sub-cells then regain their superconductivity, the flux is trapped within the material enclosed in them. The coils within the smaller sub-cells 28b-38b (i.e., coils 48b, 48d, etc.) are not energized at this time. Consequently, these portions of the disk retain their superconductivity and the lines of flux are excluded from them. After the pulsing of the coils is completed, the solenoids are sequentially energized by controller 46 to start motor 10 operation causing it to develop the required torque.

Figure 7:
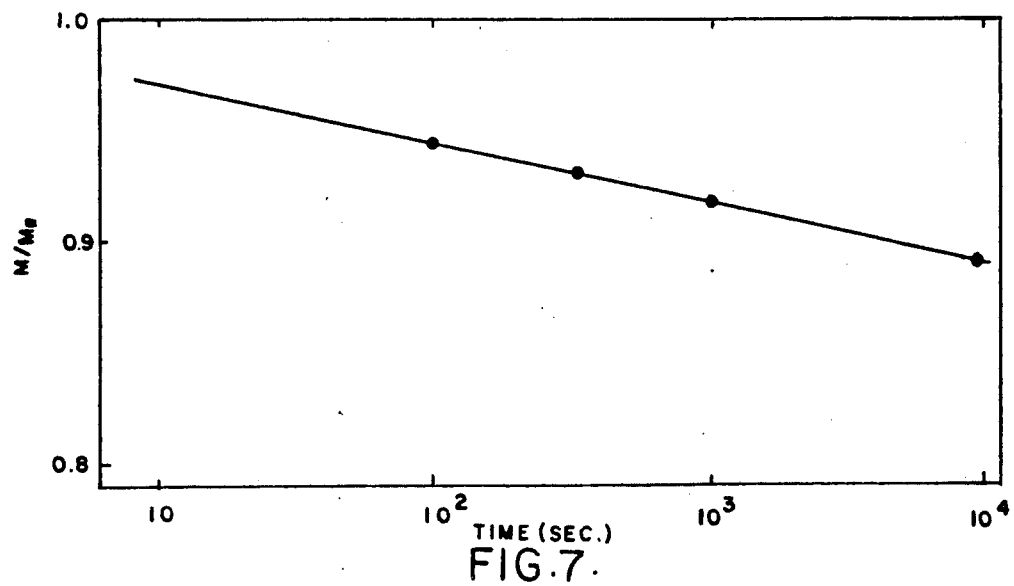

Referring to FIG. 7, motor 10 is designed so that the creep process referred to earlier in which the trapped lines of flux migrate through the disk is slowed. As shown in FIG. 7, the magnetization of the rotor assembly decreases to less than ninety percent (90%) of its peak or starting value in approximately 500 seconds, or less than ten (10) minutes. If the magnetization level falls much below this, the motor will not operate effectively. This effect can be reduced somewhat by letting the motor sit for a prolonged period of time. This will slow the flux decay rate, but the motor will still operate at a reduced flux level. In conventional superconductor motors, this means the motor would have to be stopped and recharged. In motor 10 of the present invention, this is not necessary.

Instead, solenoids 40-44 are first discharged, by stopping current flow to them, so the external magnetic field produced by them goes to zero. Next, controller 58 simultaneously energizes all the coils 48a-48l. This forces all the lines of flux entrapped in the rotor assembly to decay. Solenoids 40-44 are then re-energized. Controller 58 now de-energizes the coils 48b, 48d, etc. in the small sub-cells while maintaining current flow through the coils 48a, 48c, etc. in the large sub-cells. This causes the flux lines to penetrate the large sub-cells in the same manner as when they were at motor start-up. By periodically repeating the above steps, motor 10 operation can be maintained.

Figure 5:
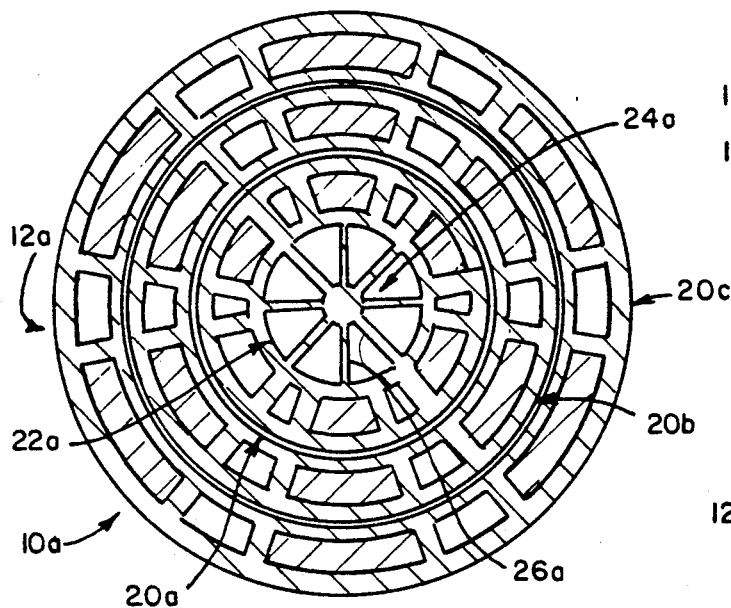
FIG. 5 is an elevational view of another embodiment of the rotor assembly.

Referring to FIG. 5, an alternate embodiment of the motor is indicated generally 10a. In this embodiment, only the rotor assembly 12a is shown. The rotor assembly includes an annular disk 20a having a central opening 22a. A shaft 24a fits in this opening to support the rotor assembly arms 26a extending radially outwardly from the shaft. Disk 20a is constructed in the same manner as disk 20 previously described. For sake of drawing clarity, the coils 48 are not shown, but it will be understood that coils are axially mounted in each of the sub-cell of disk 20a in the same manner as previously described.

In addition to disk 20a, the rotor assembly of motor 10a also includes one or more additional disks concentrically mounted on shaft 24a outwardly of disk 20a. Two such concentric disks 20b, and 20c, are shown in FIG. 5. It will be understood that there could be more, or fewer, disks than shown in the FIG. The disks 20b and 20c are identically formed to disk 20a, that is, the disks are formed of the HTSC superconductor material. They also have the same number of cells and sub-cells. The larger of the sub-cells within each cell again may be filled with a material appropriate for the specific motor application. And, again, the smaller sub-cells are hollow. Coils corresponding to coils 48a–48l are positioned within each sub-cell in the same manner as in disk 20a. The only difference between disks 20b and 20c and disk 20a, is that the former disks are proportionally larger than disk 20a.

In operation, flux is induced in the rotor assembly in the same way as previously described. That is, a current control for the stator solenoids (not shown) energizes the solenoids. A coil energization control similar to the control 58 for motor 10 then pulses the coils extending through the large sub-cells in each disk. This causes these sections of the superconductor disks which are heated to go normal. Lines of flux generated by stator solenoids penetrate into the interior of these large sub-cells. When the sub-cells regain their superconductivity, the flux is trapped. As before, the coils within the smaller sub-cells in each disk are not energized at this time so these portions of the disks retain their superconductivity and the lines of flux are excluded from them. Once pulsing of the coils in all the concentric disks is completed, the stator solenoids are sequentially energized to start motor 10a.

Similarly, creep compensation is accomplished in the manner as previously described. The difference now is that creep compensation is sequentially performed for each disk rather than simultaneously for all disks. This provides for more uniform motor operation. It will be understood, however, that there may be motor 10a applications in which simultaneous creep compensation for all the disks is appropriate. For the sequential operation, current flow to the stator solenoids is stopped so the solenoids are discharged and the magnetic field produced by them dissipated. The coil energization controller for motor 10a then simultaneously energizes all the coils in the particular disk, forcing all the lines of flux entrapped in the disk to decay. The stator solenoids are then re-energized. The coil energization controller next de-energizes the coils in the small sub-cells of the disk while maintaining current flow through the coils in the large sub-cells. Flux lines now penetrate these larger sub-cells to re-establish the level of magnetization established at motor start-up. After the operation is completed for one disk, it is performed for another of the disks.

It will be understood that the sequence in which the disks are creep compensated may vary depending upon the particular motor 10a application. Thus in one application, the sequence may be disk 20a, then disk 20b, then disk 20c. In a different application, the sequence may be reversed. If more concentric disks are employed, other sequences may be utilized. Further, it is not necessary that creep compensation of the disks be a continuous operation. Again depending upon the application of motor 10a, there may be an interval between compensation operations, or, they may be continuous. In any event, by periodically repeating creep compensation, motor 10a will be sustainable.

Figure 6A:
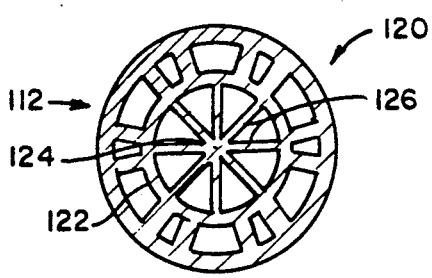
FIGS. 6a and 6b are respective elevational and plan views of yet another embodiment of the rotor assembly; and, FIG. 7 is a graph illustrating the time decay of magnetization of material comprising the rotor assembly.
Figure 6B:
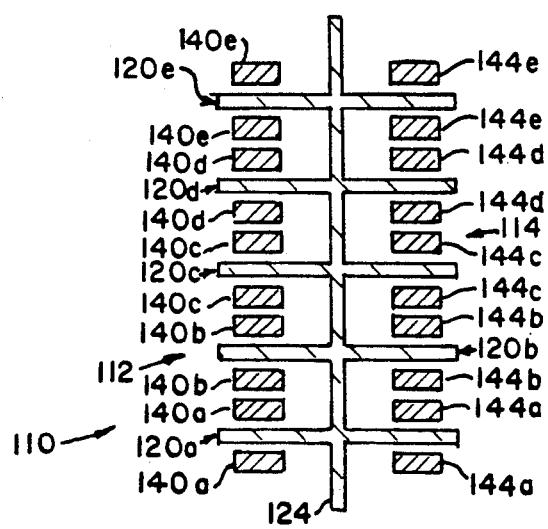

Referring to FIGS. 6a and 6b, yet another embodiment of the motor of the present invention is indicated generally 110. Motor 110 includes a rotor assembly 112 and a stator assembly 114. The rotor assembly comprises a series of disks (disks 120a–120e being shown in FIG. 6b) commonly mounted on a shaft 124 in a spaced relationship. While five (5) disks 120 are shown mounted on shaft 124, it will be understood that more, or fewer, disks could be used in motor 110.

Each disk is identical in construction to the disk 120 shown in FIG. 6a. Because disk 120 is identical in construction to the disk 20 shown in FIG. 2a, the disk will not be described in detail. As before, however the disk is annular in shape and formed of an HTSC superconductor material. The disk has a plurality of cells which are divided into a large sub-cell and an adjacent smaller sub-cell which is hollow. Coils are installed in each sub-cell. Again, the coils are not shown for sake of drawing clarity. The disk has a central opening 122 for mounting the disk on shaft 124, the disk being supported on radial support arms 126 extending outwardly from the shaft.

Stator assembly 114 comprises solenoids 140 and 144 which envelop or surround each disk of the rotor assembly. Thus, solenoids 140a and 144a are associated disk 120a, solenoids 140b and 144b are associated with disk 120b, etc. A current controller (not shown) which is similar in operation to current controller 46 controls application of current to the windings so they are sequentially energized and de-energized.

Flux is induced in the disks comprising rotor assembly 112 in the same manner as before. That is, the current control simultaneously energizes all the solenoids. A coil energization control similar to the control 58 for motor 10 then simultaneously pulses all the coils extending through the large sub-cells in the disks so these sections of the superconductor disks go normal. Again, lines of flux generated by respective stator solenoids penetrate into the interior of the large sub-cells in each respective disk. The flux is trapped when the sub-cells regain their superconductivity. As before, the coils within the smaller sub-cells in each disk are not energized at this initial stage so these portions of each respective disk retain their superconductivity with the lines of flux being excluded from them. When this initial flux charging step is completed, all the stator solenoids are sequentially energized to start motor 110.

As with motor 10a, creep compensation is sequentially performed for each disk rather than simultaneously for all disks; although, there may be motor 110 applications in which simultaneous creep compensation for all the disks is appropriate. Again, sequential compensation provides for more uniform motor operation.

During this sequential operation, current flow to the stator solenoids 140, 144 for one disk 120 is stopped so the solenoids are discharged and the magnetic field produced by them dissipated. The coil energization controller for motor 110 then simultaneously energizes all the coils in that disk, causing the lines of flux captured in the disk to decay. The stator solenoids for the disk are then re-energized. The coil energization controller next de-energizes the coils in the small sub-cells of the disk while maintaining current flow through the coils in the large sub-cells. Flux lines penetrate the larger sub-cells and re-establish the level of magnetization produced during initial motor start-up. After the operation is finished for this disk, it is performed for one of the other disks. It will be understood that while creep compensation is being performed for the particular disk, all the remaining disks can be operated normally.

The sequence in which the disks 120 are creep compensated will vary based upon the particular application of motor 110. Consequently in one application, the sequence may be disk 120a, disk 120b, etc., while in another application, the sequence may be reversed, or every other disk is done, etc. Also, more than one, but not all, disks may be done at one time. And, again, it is not necessary that creep compensation be a continuous operation, but depending upon the motor 110 application, there may be an interval between compensation operations; or, they may be continuous. Regardless, the periodic creep compensation will maintain motor 110 in operation.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. A superconductor motor comprising:
   a stator including a plurality of stator windings;
   a rotor comprising a disk formed of a superconductor material in which are entrapped magnetic lines of flux which cause the rotor to function as a magnet, the lines of flux tending to creep throughout the rotor over time thereby reducing the magnetic properties of the rotor and decreasing motor performance, the disk being divided into a plurality of cells extending axially of the disk about a circumference thereof, each cell having two axially extending sub cells each of which is formed by a circumferential opening, one of which openings subtends a larger arcuate segment than the other;
   coil means carried by the rotor and including a plurality of coils, at least one for each cell;
   means for energizing the stator windings to produce rotation of the rotor; and,
   means for energizing the coil means in a predetermined manner to compensate for the flux creep in the rotor and restore the magnetic properties of the rotor and prevent deterioration in motor performance.

2. The motor of claim 1 wherein the larger of the sub-cells into which each cell is subdivided is filled with material, the smaller of the two sub-cells being hollow, the lines of flux trapped within the rotor being trapped within the large sub-cells, and the hollow sub-cells tending to reduce flux creep throughout the disk.

3. The motor of claim 1 wherein one of the coils is installed in, each sub-cell and extends axially of the disk.

4. The motor of claim 3 wherein the energizing means includes means for first energizing all the coils to thereby eliminate all the flux trapped within the rotor, and for then de-energizing those coils installed in the hollow sub-cells whereby the lines of flux are re-established in the cells filled with the iron.

5. The motor of claim 4 wherein a resistance of the wire forming the coils is sufficiently high so the coils heat the disk.

6. The motor of claim 4 wherein the rotor further comprises a plurality of concentric disks.

7. The motor of claim 6 wherein each concentric disk has the same number of cells and sub-cells as the first said disk with the shape of each cell being proportional to the cells in the first said disk.

8. The motor of claim 7 further including a coil installed in each sub-cell of each disk.

9. The motor of claim 8 the energizing means includes means for sequentially energizing and de-energizing the coils in each disk whereby the flux trapping and creep compensation is performed first on one disk, then for a second disk, etc., thereby to maintain a given level of motor performance.

10. The motor of claim 4 wherein the rotor comprises a plurality of disks linearly mounted on a support in a spaced relationship from each other.

11. The motor of claim 10 wherein each disk is identical in construction to the first said disk.

12. The motor of claim 11 further including a coil installed in each sub-cell of each disk.

13. The motor of claim 12 wherein the energizing means includes means for sequentially energizing and de-energizing the coils in each disk whereby the flux trapping and creep compensation is performed first on one disk, then for a second disk, etc., thereby to maintain a given level of motor performance.

14. The motor of claim 12 wherein each disk is comprised of bulk HTSC superconductor material.

* * * * *

UNITED STATES PATENT AND TRADEMARK OFFICE
CERTIFICATE OF CORRECTION

PATENT NO. : 5,138,207
DATED : August 11, 1992
INVENTOR(S) : Mohamed A. Hilal, et. al.

It is certified that error appears in the above-indentified patent and that said Letters Patent is hereby corrected as shown below:

Column 3, line 6, "The cryostats, for example" should be --. The cryostats are, for example --.

Column 8, Claim 3, line 11, "installed in, each" should be -- installed in each --.

Column 8, Claim 9, line 29, "The motor of claim 8 the" should be -- The motor of claim 8 wherein the --.

Signed and Sealed this

First Day of February, 1994

Attest:

BRUCE LEHMAN

*Attesting Officer*     Commissioner of Patents and Trademarks